(12) United States Patent  
Heyman et al.

(10) Patent No.: US 8,070,288 B2
(45) Date of Patent: Dec. 6, 2011

(54) EYE SHIELD STRUCTURE

(75) Inventors: Arnold M. Heyman, Los Angeles, CA (US); Craig R. McCrary, Valencia, CA (US)

(73) Assignee: Neotech Products, Inc., Valencia, CA (US)

( * ) Notice: Subject to any disclaimer, the term of this patent is extended or adjusted under 35 U.S.C. 154(b) by 369 days.

(21) Appl. No.: 12/378,945

(22) Filed: Feb. 23, 2009

(65) Prior Publication Data

US 2010/0214529 A1 Aug. 26, 2010

(51) Int. Cl.
*G02C 3/00* (2006.01)
(52) U.S. Cl. .......................................... 351/156
(58) Field of Classification Search .................. 351/156, 351/157, 158, 41; 2/9, 235, 239, 250, 426, 2/452, 454
See application file for complete search history.

(56) References Cited

U.S. PATENT DOCUMENTS

| | | | |
|---|---|---|---|
| 5,042,094 A * | 8/1991 | Sadowsky | 2/439 |
| 5,268,710 A * | 12/1993 | Anstey | 351/121 |
| 5,818,569 A * | 10/1998 | Berent | 351/156 |
| D410,021 S | 5/1999 | Heyman et al. | |
| 6,571,799 B1 | 6/2003 | Daly | |
| 6,902,272 B2 * | 6/2005 | Woford | 351/156 |

\* cited by examiner

*Primary Examiner* — Hung Dang

(74) *Attorney, Agent, or Firm* — William W. Haefliger

(57) ABSTRACT

Eye shade structure comprising inner and outer compressible material layers, and a resiliently compressible intermediate layer sandwiched between the inner and outer layers, the layers being flexible and locally compressed to define two re-entrant recesses adapted to be located over the user's eyes, the locally compressed layers defining reduced thickness sections of the layers in registration with the recesses, the inner and outer layers having portions bounding the recesses, and providing cushions to engage users facial structure bounding the eyes.

35 Claims, 3 Drawing Sheets

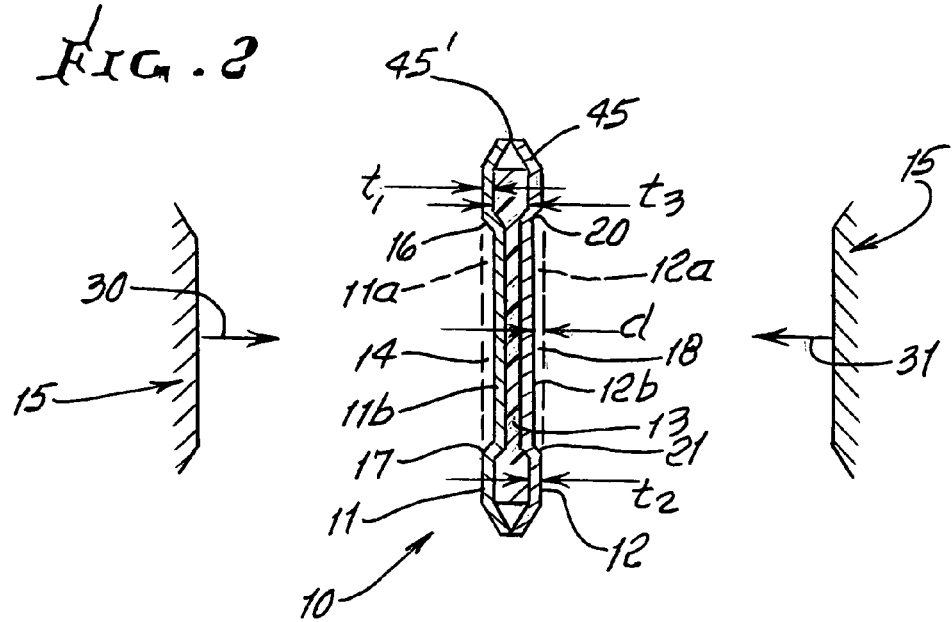
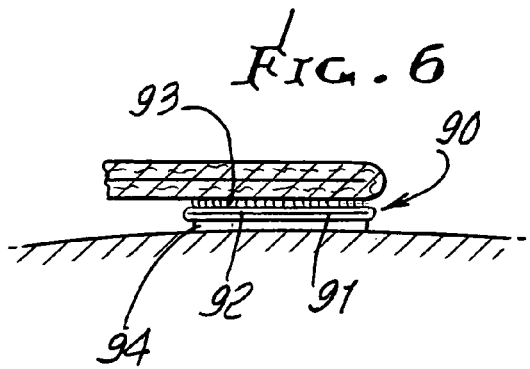
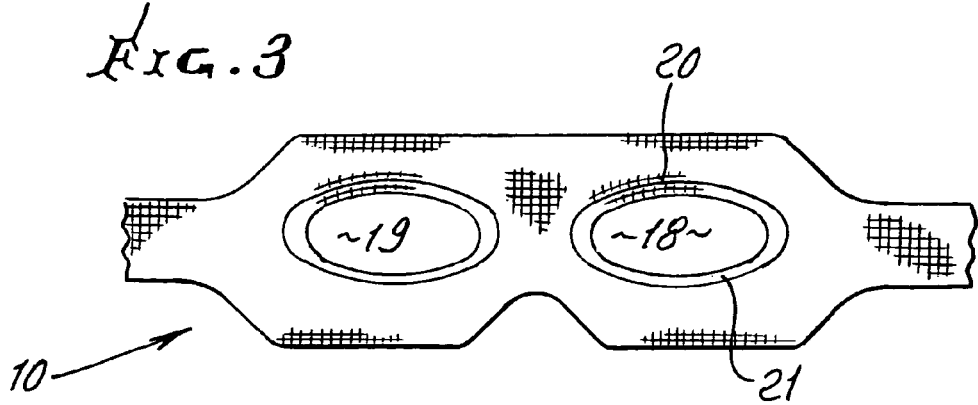

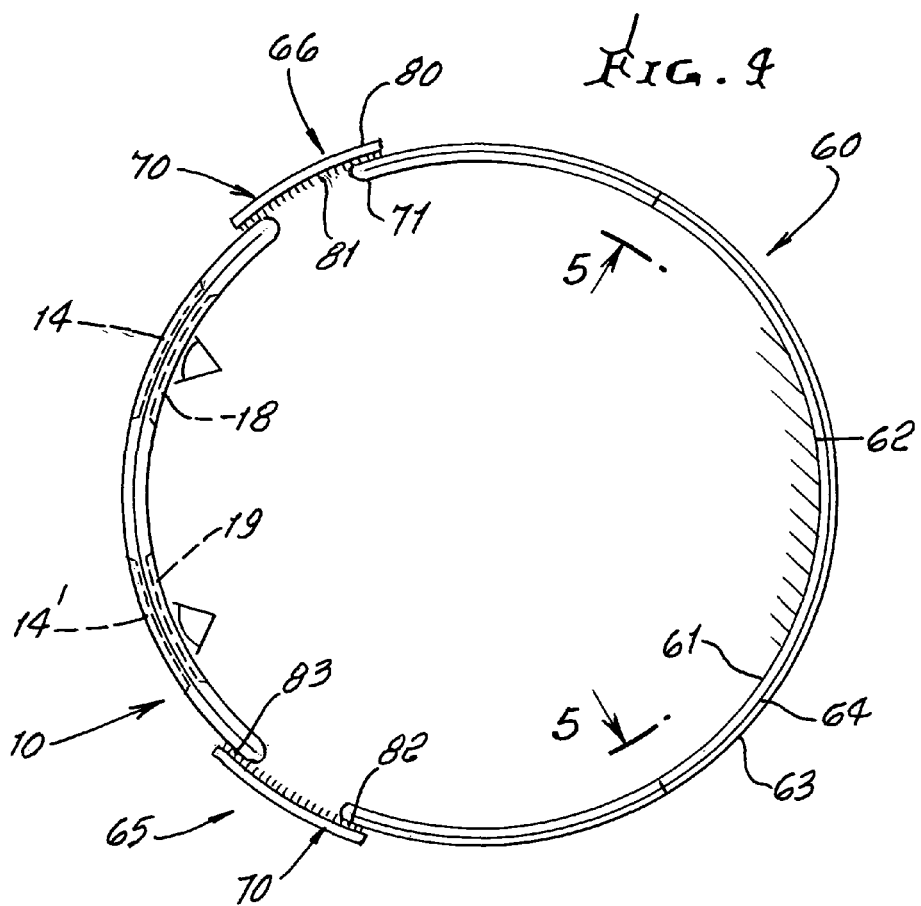
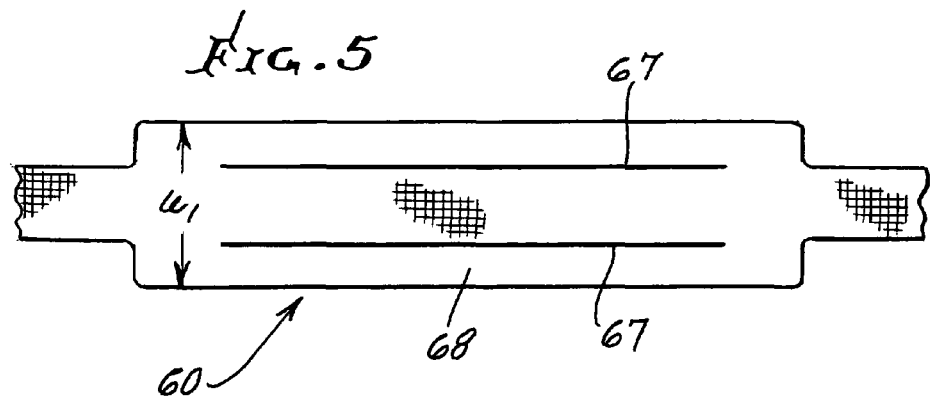

EYE SHIELD STRUCTURE

BACKGROUND OF THE INVENTION

This invention relates generally to eye protection, and more specifically to improvements in structure of eye shade devices.

There is need for disposable, simple, inexpensive eye shade devices, particularly as applicable to the heads of infants so as to extend over the eyes. There is also need to provide improved devices which are easily applied over the eyes and configured to allow eyelid movement despite retention of the device or devices directly over the user's eyes.

SUMMARY OF THE INVENTION

It is a major object of the invention to provide an improved, simple, inexpensive eye shade device, or devices, meeting the above needs. Basically, the invention is embodied in eye shade structure that comprises:

a) inner and outer compressible material layers, and a resiliently compressible intermediate layer sandwiched between the inner and outer layers, b) the layers being flexible and locally compressed to define two re-entrant recesses adapted to be located over the user's eyes, c) the locally compressed layers defining reduced thickness sections of said layers in registration with such recesses, d) the inner and outer layers having portions bounding the recesses, and providing cushions to engage user's facial structure bounding the eyes.

It is another object to provide such structure configured to have spectacles shape, and with retention band means attached to the layers at opposite ends of the spectacles so as to extend about the user's head.

A further object is to provide the layers in compressible material form, the intermediate layer consisting of synthetic resinous foam. As will be seen, the inner and outer layers may advantageously comprise brushed NYLON, for skin contact comfort, and the intermediate layer may consist of polyester foam capable of being compressed under heat application to retain compressed composite shape.

Yet another object is to provide the two spaced re-entrant recesses formed by one of said inner and outer layers, and there being two additional re-entrant recesses formed by the other of the inner and outer layers, and in registration with the respective recesses formed by the one layer.

As will be seen, the two recesses formed by the one layer typically face in a first direction, and the recesses formed by the other layer face in a second direction, opposite said first direction. All of the recesses may typically have the same shallow depth. Also, the two reduced thickness sections each have thickness less than one-half the thickness of the layers bounding such recesses.

A further object is to provide retention band means having
   i) an inner layer that is surface tacky to removably adhere to the wearer's skin,
   ii) an outer support layer that is adherent to said inner layer.

The band typically has an anchoring sub-section of increased overall width along band length subtended by said slit. Also, support tab means press-connects an end portion of said band support layer to one of said inner and outer layers.

A further object includes provision of retention tab means attached to said spectacles so as to retain the spectacles to the user's head. The retention tab includes at least one tab compressing a support layer having a tacky surface to adhere to the user's skin, and a carrier layer attached to the support layer and being press-connectible to one of said inner and outer layers.

An added object is to provide spectacles graphics on one of the inner and outer layers, to define graphical rims bounding the recesses.

These and other objects and advantages of the invention, as well as the details of an illustrative embodiment, will be more fully understood from the following specification and drawings, in which:

DRAWING DESCRIPTION

FIG. 2 is an enlarged section taken on lines 2-2 of FIG. 1;

FIG. 3 is a rear elevation taken on lines 3-3 of FIG. 1;

FIG. 4 is a plan view of a band attached to spectacles structure, and extending about a wearer's head;

FIG. 5 is a view taken on lines 5-5 of FIG. 4; and

FIG. 6 is a section showing a modification.

DETAILED DESCRIPTION

Figure 1:
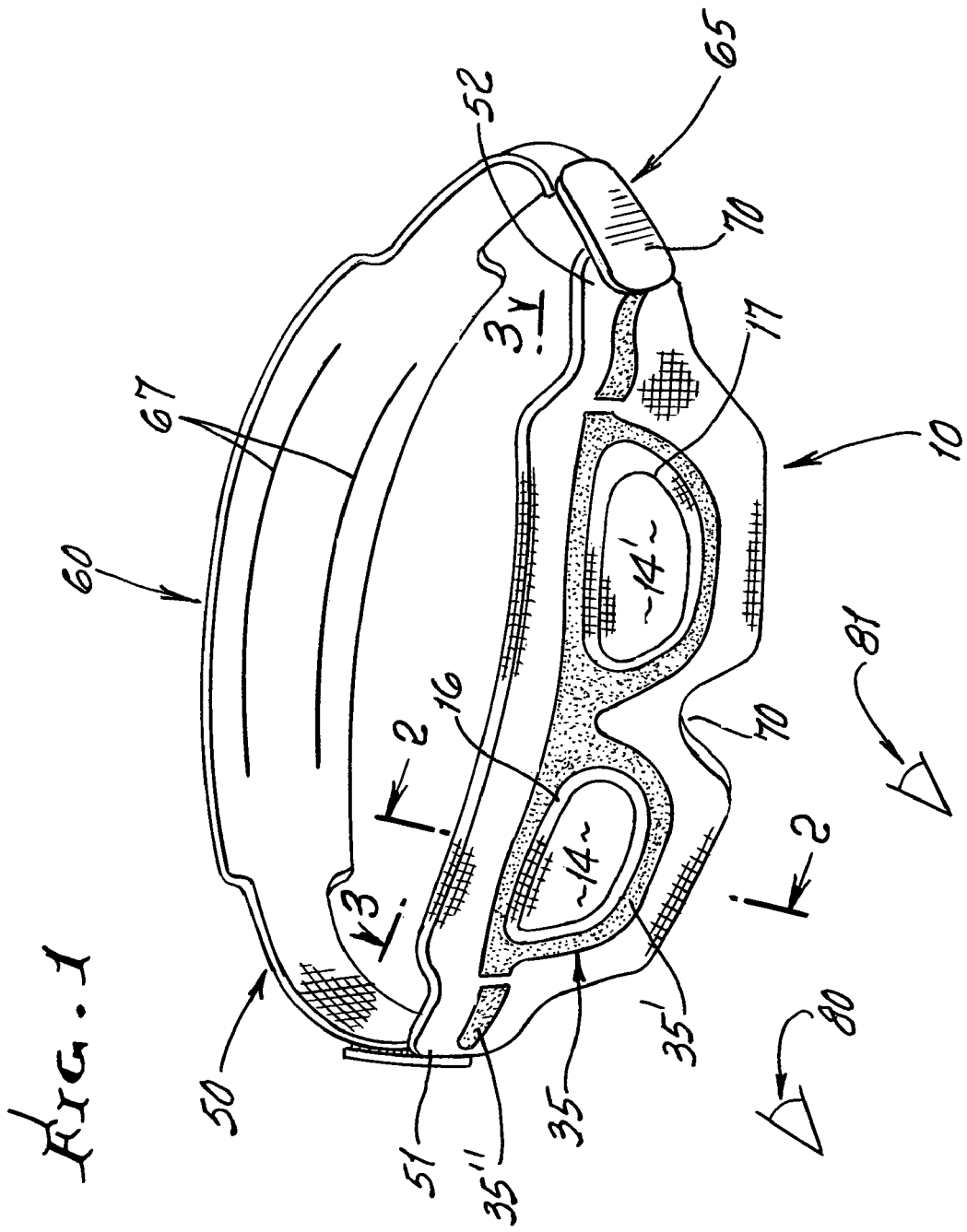
FIG. 1 is a perspective view showing one preferred form of the invention in elevation.

In FIGS. 1 and 2, the shade structure 10 includes inner and outer compressible layers 11 and 12, and a resiliently compressive intermediate material layer 13 sandwiched between and adhesively bonded to 11 and 12 to provide a single unit. The layers are flexible, and have thickness $t_1$, $t_2$ and $t_3$, where $$t_3 > t_1$$

$$t_3 > t_2$$

$$t_1 = t_2$$

over the major extents of the structure.

The layers are locally compressed to define two re-entrant recesses 13 and 14 sized and positioned to extend over, or in registration with the user's eyes, as for example an infant's eyes 80 and 81. FIG. 2 shows, in broken lines at 11a and 12a the surfaces of the layers 11 and 12 prior to their compression to thinned positions at 11b and 12b, with reduced thickness intermediate layer 13b therebetween. These compressed portions of the structure may be formed as by a forming tool or tools 15 heated to forming temperature $T_2$ and pressed against the layer 11 at the local zones of recesses 13 and 14. See also the re-entrant transition thickness zones or cushioning portions 16 and 17 connecting 11 and 11b, looping about the recesses 13 and 14 with beveled slopes as shown, and corresponding bevel walls of tools 15.

An additional forming tool 15' is typically employed at the opposite side of the structure to press against the layer 12 and at the local zones of recesses 18 and 19. See also the resultant transition thickness zones or cushioning portions 20 and 21 connecting 12 and 12b, looping about the recesses 18 and 19, with beveled slopes as shown. Resultant zone 13 is opposite zone 18; and zone 14 is opposite zone 19. Nose notch 70 is located in the layered composite, between 13 and 14, and between 18 and 19.

As shown, the recesses 13 and 14 formed by thinned layer 11 face in a first direction 30; and the recesses 18 and 19 formed by thinned layer 12 face in the opposite direction 31. Also, all recesses may typically have approximately the same shallow depth "d".

Further, as an indicator of placement over the eyes, graphics are typically displayed or printed on one of the layers 11 and 12, as for example in spectacles form, as indicated at 35 in FIG. 1. See for example printing at 35', indicating spectacle rims bounding the recess and printing at 35" indicating the shape of spectacles ear stems. The inner and outer layers are also formed at their bounding outer edges to have convex curvature as at 45, to meet or approximately meet at 45', enclosing the adjacent intermediate layer extent 46. As a result, the three composite layers form cushions between the recesses and the layer outer bounding extents, which have comfortable contact with the wearer's skin when held in position as by resiliently yieldable head band structure 50. The latter has connection to the described layers at reduced width zones 51 and 52. In this regard, the inner and outer layers 11 and 12 advantageously consist of resiliently compressible material such as brushed NYLON, and the intermediate layer 13 may advantageously consist of polyester foam. The overall thickness of the material between opposite recesses 13 and 18, and between opposite recesses 14 and 19 is typically less than ½ inch the overall thickness of the uncompressed layers at zones bounding the recesses. This provides for recess 13 and 14 depth's from the outer surface of layer 11 accommodating blinking of the user's eyes.

The entire structure between 51 and 52 is preferably a one-piece, resiliently compressible bendable one-piece frame unit.

Referring to FIGS. 4 and 5, a retention band or band means 60 includes
  i) an inner layer 61 that is surface tacky or sticky (non slip) is adapted to adhere to the user's head skin 62; and
  ii) an outer or support layer 63 adherent to the inner layer, at 64, as via suitable adhesive.

Connections to the ends of the device 10 of FIG. 1 are shown, generally, at 65 and 66. The band 60 is preferably yieldably resilient, i.e. resiliently stretchable. As shown in FIG. 5, the band typically has at least one, and preferably two laterally spaced, longitudinally elongated slits 67, formed in an intermediate anchoring sub-section 68 of increased overall width $w_1$. Slits 67 extend in parallel relation in 68. The inner layer may preferably consist of polyester-polyurethane material; and the outer layer may preferably consist of Nylon/Spandex material, whereby the band is easily foldable, and yet acts as an anchor, due to increased "stickiness" area.

Also, at 65 and 66, retention or support tab means 70 is provided to press-connect an end portion 71 of the band support layer to one of the inner and outer layers 61 and 63. Two such tabs are shown, to connect opposite ends of the spectacles shape. Tab 70 comprises a support layer 80 and a VELCRO (hook) layer 81 bonded to 80, and adapted to hook connect to the end of the band, at 82, and to hook connect to the fabric of the spectacles unit, at 83. It may be pulled free of either or both connections at 82 and 83, and re-attached, to adjust length.

FIG. 6 shows an alternate retention tab 90 to directly connect the spectacles unit to the user's skin, as at the side of the head. It includes a support layer 91 having a tacky (non-slip) surface to adhere to the user's skin, at selected location, and a carrier or base layer 92 attached to 91. Layer 92 is press-connectible to the spectacles material, via VELCRO connection at 93. A peel-off thin plastic cover layer 94 is located on 91 to protect the sticky surface, prior to use.

What is claimed is:

1. Eye shade structure comprising in combination:
   a) inner and outer compressible material layers, and a resiliently compressible intermediate layer sandwiched between the inner and outer layers,
   b) said inner, outer and intermediate layers being flexible and locally compressed to define two oppositely facing re-entrant recesses adapted to be located over the user's eyes,
   c) said locally compressed and reduced thickness layers defining reduced thickness sections of said inner, outer and intermediate layers in registration with said recesses,
   d) said inner and outer layers having portions bounding said recesses, and providing cushions to engage users facial structure bounding the eyes,
   e) said intermediate layer being retained between said portions of the inner and outer layers at first locations bounding said recesses, and also retained between said inner and outer reduced thickness sections of said inner and outer layers at second locations bounded by said first locations.

2. The combination of claim 1 wherein said structure is configured to have spectacles shape.

3. The combination of claim 2 including retention band means attached to said spectacles so as to extend about the user's head.

4. The combination of claim 3 wherein said retention band means includes
   i) an inner layer that is surface tacky to removably adhere to the wearer's skin,
   ii) an outer support layer that is adherent to said inner layer.

5. The combination of claim 4 wherein said band means defines at least one elongated slit separating the band into lengthwise elongated sections individually adjustable to the wearer's skin.

6. The combination of claim 5 wherein the band means has an anchoring sub-section of increased overall width along band length subtended by said slit.

7. The combination of claim 6 wherein there are two of said slits that extend in parallel relation in said sections.

8. The combination of claim 4 including a support tab press-connecting an end portion of said band support layer to one of said inner and outer layers.

9. The combination of claim 8 including support tabs press-connecting end portions of said band support layers to one of said inner and outer layers at opposite ends of said spectacles shape.

10. The combination of claim 4 wherein said inner layer consists of polyester-polyurethane material.

11. The combination of claim 4 wherein said outer layer consists of Nylon/Spandex material, which is stretchable to fit the contour of the user's skin.

12. The combination of claim 2 including retention tab means attached to said spectacles so as to retain the spectacles to the user's head.

13. The combination of claim 12 wherein said retention tab means includes at least one tab compressing a support layer having a tacky surface to adhere to the user's skin, and a carrier layer attached to the support layer and being press-connectible to one of said inner and outer layers.

14. The combination of claim 13 wherein the carrier layer has VELCRO attachment to said one of the inner and outer layers.

15. The combination of claim 2 including retention tab means attached to said structure so as to retain the structure to the user's head.

16. The combination of claim 15 wherein said retention tab means includes at least one tab compressing a support layer having a tacky surface to adhere to the user's skin, and a carrier layer attached to the support layer and being press-connectible to one of said inner and outer layers.

17. The combination of claim 1 wherein said layers consist of the same compressible material, and said intermediate layer consists of synthetic resinous foam.

18. The combination of claim 1 wherein said two recesses are formed by one of said inner and outer layers, and there are two additional re-entrant recesses formed by the other of said inner and outer layers, and in registration with the respective recesses formed by said one layer.

19. The combination of claim 18 wherein said recesses formed by said one layer face in a first direction, and said recesses formed by the other layer face in a second direction opposite said first direction.

20. The combination of claim 18 wherein all of said recesses have approximately the same shallow depth.

21. The combination of claim 18 including spectacle graphics on one of said layers, to define rims bounding said recesses.

22. The combination of claim 1 including spectacle graphics on one of said layers, to define rims bounding said recesses.

23. The combination of claim 1 wherein said reduced thickness sections have thickness less than one-half the thickness of said layers bounding said recesses.

24. The combination of claim 1 wherein said inner and outer layers comprise brushed NYLON.

25. The combination of claim 1 wherein said intermediate layer consists of polyester foam.

26. The combination of claim 1 wherein said inner and outer layers consist of brushed NYLON, or equivalent, and said intermediate layer consists of polyester foam, or equivalent.

27. The combination of claim 1 wherein the entire unit consists of a resiliently compressible and bendable one-piece frame unit.

28. In combination with eye shade structure characterized as compressible when applied to the head to extend over the eyes, retention band means attached to said structure, to extend about the user's head, said retention band means comprising:
   i) an inner layer that is surface tacky to removably adhere to the wearer's skin,
   ii) an outer support layer that is adherent to said inner layer.

29. The combination of claim 28 wherein said band means defines at least one elongated slit separating the band into lengthwise elongated sections individually adjustable to the wearer's skin.

30. The combination of claim 29 wherein said band means has a section of increased overall width along band length subtended by said slit.

31. The combination of claim 30 wherein there are two of said slits that extend in parallel relation in said sections.

32. The combination of claim 28 including a support tab press-connecting an end portion of said band support layer to one of said inner and outer layers.

33. The combination of claim 32 including support tabs press-connecting end portions of said band support layers to one of said inner and outer layers at opposite ends of said spectacles shape.

34. The combination of claim 32 wherein said inner layer consists of polyester-polyurethane material.

35. The combination of claim 32 wherein said outer layer consists of Nylon/Spandex material, which is stretchable to fit the contour of the user's skin.

* * * * *